United States Patent
Park et al.

(10) Patent No.: US 10,170,998 B2
(45) Date of Patent: Jan. 1, 2019

(54) METHOD FOR GENERATING INJECTION CURRENT FOR FUEL CELL STACK AND APPARATUS FOR PERFORMING THE SAME

(71) Applicant: HYUNDAI AUTRON CO., LTD., Seongnam-si (KR)

(72) Inventors: Hyun-Seok Park, Gunpo-si (KR); Sun-Doo Kang, Seongnam-si (KR); Mun-Ki Ko, Yongi-si (KR)

(73) Assignee: Hyundai Autron Co.,Ltd., Seongnam-si (KR)

( * ) Notice: Subject to any disclaimer, the term of this patent is extended or adjusted under 35 U.S.C. 154(b) by 700 days.

(21) Appl. No.: 14/564,511

(22) Filed: Dec. 9, 2014

(65) Prior Publication Data

US 2015/0180348 A1 Jun. 25, 2015

(30) Foreign Application Priority Data

Dec. 20, 2013 (KR) .......................... 10-2013-0159880

(51) Int. Cl.

| | | |
|---|---|---|
| H02J 1/00 | (2006.01) | |
| H02J 3/00 | (2006.01) | |
| H02M 3/335 | (2006.01) | |
| H01M 8/04537 | (2016.01) | |
| H01M 8/04664 | (2016.01) | |
| H02M 3/155 | (2006.01) | |
| H01M 8/1018 | (2016.01) | |

(52) U.S. Cl.
CPC ... *H02M 3/33507* (2013.01); *H01M 8/04559* (2013.01); *H01M 8/04589* (2013.01); *H01M 8/04649* (2013.01); *H01M 8/04679* (2013.01); *H01M 2008/1095* (2013.01); *H01M 2250/20* (2013.01); *H02M 3/155* (2013.01); *Y02T 90/32* (2013.01); *Y10T 307/609* (2015.04)

(58) Field of Classification Search
CPC ............ H02M 3/33507; H02M 3/155; H01M 8/04559; H01M 8/04649; H01M 8/04589; H01M 8/04679; H01M 2008/1095; H01M 2250/20; Y02T 90/32; Y10T 307/609
USPC .......................................................... 307/63
See application file for complete search history.

(56) References Cited

U.S. PATENT DOCUMENTS

| | | | |
|---|---|---|---|
| 6,043,633 A * | 3/2000 | Lev ..................... | H02M 1/4225 323/222 |
| 2009/0061263 A1 | 3/2009 | Watanabe | |
| 2010/0286939 A1 | 11/2010 | Oh et al. | |

(Continued)

FOREIGN PATENT DOCUMENTS

| | | |
|---|---|---|
| CN | 1758066 A | 4/2006 |
| CN | 101384127 A | 3/2009 |
| DE | 102 02 172 A1 | 8/2003 |

(Continued)

*Primary Examiner* — Richard Tan
(74) *Attorney, Agent, or Firm* — Morgan, Lewis & Bockius LLP (57) ABSTRACT

An apparatus for generating injection current for a fuel cell stack includes a switch configured to retain any one state of an on state and an off state; an inductor configured to output accumulated energy according to a state of the switch; and a converter configured to provide an output of the inductor to a load or convert the output into a predetermined voltage and provide the predetermined voltage to a load.

13 Claims, 4 Drawing Sheets

(56) References Cited

U.S. PATENT DOCUMENTS

2011/0190959 A1* 8/2011 Manabe .............. H01M 8/0488
  700/298
2014/0070820 A1* 3/2014 Depernet ........... G01R 31/3662
  324/650

FOREIGN PATENT DOCUMENTS

| DE | 10 2010 005 736 A1 | 9/2010 |
| DE | 10 2011 005 966 A1 | 9/2012 |
| DE | 11 2009 004 773 T5 | 10/2012 |
| EP | 1 646 101 A2 | 4/2006 |
| KR | 10-2010-0121354 A | 11/2010 |
| KR | 10-1090705 B1 | 12/2011 |

* cited by examiner

SIGNAL CURRENT

SIGNAL CURRENT
FREQUENCY ANALYSIS

FIG. 3A

STACK VOLTAGE

STACK VOLTAGE
FREQUENCY ANALYSIS

METHOD FOR GENERATING INJECTION CURRENT FOR FUEL CELL STACK AND APPARATUS FOR PERFORMING THE SAME

CROSS REFERENCE TO RELATED APPLICATION

This application claims the benefit of Korean Patent Application No. 10-2013-0159880, filed on Dec. 20, 2013, entitled "METHOD FOR GENERATING INJECTION CURRENT FOR FUEL CELL STACK AND APPARATUS FOR PERFORMING THE SAME", which is hereby incorporated by reference in its entirety into this application.

BACKGROUND OF THE INVENTION

Field of Invention

The present disclosure relates to a method for generating injection current for a fuel cell stack and an apparatus for performing the same.

Description of Related Art

A fuel cell is a kind of a power generating device which does not convert the chemical energy of a fuel into heat by combustion but converts the chemical energy into electrical energy by an electrochemical reaction in a stack, and may be used to not only supply industrial power, home power and vehicle driving power but also supply power to a small electric/electronic product, particularly, a portable device.

As a power supply source for driving a vehicle, a polymer electrolyte membrane fuel cell (PEMFC) (a proton exchange membrane fuel cell) having the highest power density among fuel cells has been currently studied mainly. The polymer electrolyte membrane fuel cell has a rapid start time and a rapid power converting reaction time due to a low operation temperature.

The polymer electrolyte membrane fuel cell is configured to include a membrane electrode assembly (MEA) in which catalyst electrode layers in which electrochemical reactions occur are attached to both sides of a solid polymer electrolyte membrane through which hydrogen ions pass, gas diffusion layers (GDL) which serve to uniformly distribute reaction gases and transfer generated electrical energy, gaskets and coupling mechanisms which maintain airtightness of the reaction gases and a coolant and an appropriate coupling pressure, and bipolar plates which move the reaction gases and the coolant.

When a fuel cell stack is assembled using the configuration of a unit cell as described above, the combination of the membrane electrode assembly and the gas diffusion layers, which are main parts, is positioned in the innermost portion of the cell. The membrane electrode assembly has the catalyst electrode layers applied with catalysts to allow hydrogen and oxygen to react with each other, that is, an anode and a cathode, on both surfaces of the polymer electrolyte membrane, and the gas diffusion layers, the gaskets, and so forth are stacked on the outer sides of the anode and the cathode.

The bipolar plates formed with flow fields, through which the reaction gases (hydrogen as a fuel and oxygen or air as an oxidizer) are supplied and the coolant passes, are positioned on the outer sides of the gas diffusion layers. After a plurality of unit cells each having the above-mentioned configuration are stacked, current collectors, insulating plates, and end plates for supporting the stacked cells are coupled to outermost portions. The fuel cell stack is configured by repeatedly stacking and coupling the unit cells between the end plates.

In order to obtain the potential actually required in a vehicle, unit cells should be stacked to correspond to the required potential, and the structure formed by stacking the unit cells is referred to as a stack. The potential generated by one unit cell is about 1.3V. Therefore, in order to generate the power required for driving a vehicle, a plurality of cells are stacked in series.

SUMMARY OF INVENTION

Various embodiments are directed to a method for generating injection current for a fuel cell stack and an apparatus for performing the same, in which an alternating current component generated due to a change in the state of a switch is generated in the stack current flowing from a fuel cell stack to a load, whereby it is possible to simplify the configuration of an apparatus for generating alternating current to diagnose a fault of a fuel cell stack, decrease the volume of parts and reduce the cost of a product.

Also, various embodiments are directed to a method for generating injection current for a fuel cell stack and an apparatus for performing the same, in which a boost voltage generated by an inductor according to a change in the state of a switch is provided to a load as it is or is provided to a load after being converted into a predetermined voltage, whereby it is possible to improve the efficiency of a system.

Further, various embodiments are directed to a method for generating injection current for a fuel cell stack and an apparatus for performing the same, in which a resistor is not used, whereby it is possible to decrease heat loss by the current flowing through the resistor, ease a heat dissipation scheme, decrease the volume of parts and reduce the cost of the parts.

Objects to be solved by the present invention are not limited to the above-mentioned objects, and other objects that are not mentioned may be clearly understood by those skilled in the art in the following description.

In an embodiment, an apparatus for generating injection current for a fuel cell stack may include: a switch configured to retain any one state of an on state and an off state; an inductor configured to output accumulated energy according to a state of the switch; and a converter configured to provide an output of the inductor to a load or convert the output into a predetermined voltage and provide the predetermined voltage to a load.

The switch may generate an alternating current component in the form of a square wave, in signal current which is applied from the fuel cell stack, while being changed in its state by the unit of a predetermined time according to a frequency to be used.

The inductor may accumulate energy at both ends thereof when the state of the switch retains the on state, and output the accumulated energy as a boost voltage when the state of the switch is changed from the on state to the off state.

The apparatus may further include a control unit configured to calculate current of the fuel cell stack by using the signal current, and calculate impedance of the fuel cell stack by using current of the fuel cell stack and a voltage of the fuel cell stack.

The control unit may calculate current of the fuel cell stack corresponding to a predetermined frequency by frequency-analyzing the signal current.

The control unit may calculate a voltage of the fuel cell stack corresponding to a predetermined frequency by frequency-analyzing a voltage of the fuel cell stack.

The control unit may calculate a total harmonic distortion (THD) by using a result of a frequency analysis corresponding to the predetermined frequency, and determine whether a fault has occurred in the fuel cell stack, by using the total harmonic distortion.

The control unit may determine whether the total harmonic distortion is a predetermined total harmonic distortion or over, and determine whether a fault has occurred in the fuel cell stack, according to a determination result.

The control unit may calculate a voltage of the fuel cell stack corresponding to any one frequency of 300 Hz and 10 Hz.

In an embodiment, a method for generating injection current for a fuel cell stack, performed in an apparatus for generating injection current for a fuel cell stack, may include: accumulating energy in an inductor when a state of a switch retains an on state; outputting accumulated energy as a boost voltage when the state of the switch is changed from the on state to an off state; and providing the boost voltage to a load or converting the boost voltage into a predetermined voltage and providing the predetermined voltage to a load, by a converter.

The method may further include generating an alternating current component in the form of a square wave, in signal current which is applied from the fuel cell stack, while the state of the switch is changed by the unit of a predetermined time according to a frequency to be used.

The method may further include calculating current of the fuel cell stack by using the signal current; and calculating impedance of the fuel cell stack by using current of the fuel cell stack and a voltage of the fuel cell stack.

The calculating of the current of the fuel cell stack may include calculating current of the fuel cell stack corresponding to a predetermined frequency by frequency-analyzing the signal current.

The calculating of the impedance of the fuel cell stack may include calculating a voltage of the fuel cell stack corresponding to a predetermined frequency by frequency-analyzing a voltage of the fuel cell stack.

The calculating of the voltage of the fuel cell stack may include calculating a total harmonic distortion (THD) by using a result of a frequency analysis corresponding to the predetermined frequency, and determining whether a fault has occurred in the fuel cell stack, by using the total harmonic distortion.

The determining of whether a fault has occurred in the fuel cell stack may include determining whether the total harmonic distortion is a predetermined total harmonic distortion or over, and determining whether a fault has occurred in the fuel cell stack, according to a determination result.

The calculating of the voltage of the fuel cell stack corresponding to the predetermined frequency may calculate a voltage of the fuel cell stack corresponding to any one frequency of 300 Hz and 10 Hz.

Specific matters of other exemplary embodiments will be included in a detailed description and the accompanying drawings.

Advantages and/or features of the present invention and methods to achieve them will be elucidated from exemplary embodiments described below in detail with reference to the accompanying drawings. However, the present invention is not limited to exemplary embodiment disclosed below, but will be implemented in various forms. The exemplary embodiments of the present invention make disclosure of the present invention thorough and are provided so that the scope of the present invention is fully conveyed to those skilled in the art. Therefore, the present invention will be defined by the scope of the appended claims. Like reference numerals denote like elements throughout the description.

DETAILED DESCRIPTION

A conventional apparatus for diagnosing a fault of a fuel cell stack determines whether a fault has occurred or not, by injecting alternating current into a fuel cell stack, detecting the voltage of the fuel cell stack, and calculating a total harmonic distortion (THD) using a result of analysis.

When sinusoidal alternating current is used by being added to operating current, the voltage of a normal cell is changed in a linear section, and the voltage of an abnormal cell is changed in a nonlinear section. The current of the fuel cell stack is the sum of the operating current and the sinusoidal alternating current.

When measuring the voltage of the fuel cell stack according to the current of the fuel cell stack, the voltage of the normal cell has a low THD according to a change in cell current, whereas the voltage of the abnormal cell has a large amplitude and a high THD according to a change in cell current.

The THD is measured as the sum of harmonic components versus the fundamental frequency of the injected alternating current. The conventional apparatus for diagnosing a fault of a fuel cell stack may determine whether a fault has occurred or not, by calculating the THD through frequency analysis of the voltage of the fuel cell stack and diagnosing the voltages of cells.

The conventional apparatus for diagnosing a fault of a fuel cell stack is configured by three main elements, i.e., the injection unit of the fuel cell stack, a unit for measuring the voltage of the fuel cell stack, and a fault diagnosing unit.

In order to diagnose a fault of a fuel cell stack by using a THD, alternating current is injected into the fuel cell stack. In order to generate the alternating current, the direct current of a voltage corresponding to a battery for a vehicle is boosted through a DC-DC converter, the boosted direct current is converted into alternating current through a DC-AC converter, a predetermined frequency is filtered, and the alternating current of the predetermined frequency is applied to the fuel cell stack.

Such a method of injecting alternating current to diagnose a fault of a fuel cell stack has disadvantages in that a configuration is complicated, a large number of parts are needed, and thus the cost of parts increases. In order to cope with this problem, embodiments of the present disclosure provide a method for generating injection current for a fuel cell stack and an apparatus for performing the same, in which an alternating current component generated by changing the state of a switch is generated in the signal current applied from a fuel cell stack.

Hereinafter, exemplary embodiments of the present invention will be described in detail with reference to the accompanying drawings.

Figure 1:
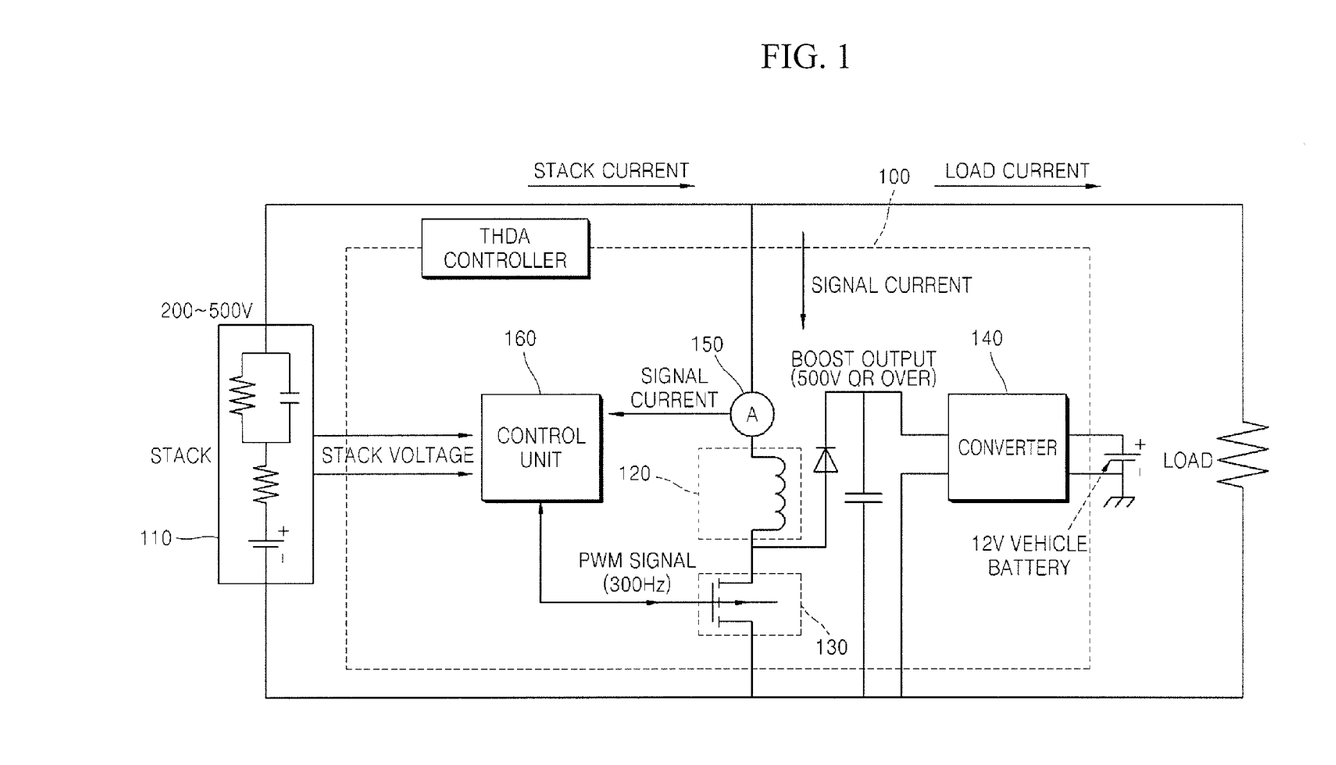
FIG. 1 is a block diagram of an apparatus for generating injection current for a fuel cell stack in accordance with an embodiment.

FIG. 1 is a block diagram of an apparatus for generating injection current for a fuel cell stack in accordance with an embodiment.

Referring to FIG. 1, an apparatus 100 for generating injection current for a fuel cell stack includes a fuel cell stack 110, an inductor 120, a switch 130, a converter 140, a current sensor 150, and a control unit 160.

The fuel cell stack 110 is configured as a plurality of unit cells are continuously arranged. Signal current is applied to the fuel cell stack 110, and an alternating current component generated according to a change in the state of the switch 130 is included in the signal current. The alternating current component included in the signal current exerts an influence on the current of the fuel cell stack 110, as it is.

Accordingly, by analyzing the signal current applied from the fuel cell stack 110, the current of the fuel cell stack 110 may be calculated. Such a process will be described later in detail when explaining the control unit 160.

The inductor 120 outputs accumulated energy according to a change in the state of the switch 130. In detail, when the state of the switch 130 is retained in an on state, energy is accumulated at both ends of the inductor 120, and, when the state of the switch 130 is changed from the on state to an off state, the energy accumulated at both ends of the inductor 120 is not discharged and thus an abnormal voltage (that is, a boost voltage) is outputted. The boost voltage means a voltage of 500V or over.

As the switch 130 is changed to the on state or the off state with a predetermined frequency according to the control of the control unit 160, it generates the alternating current component in the signal current applied from the fuel cell stack 110.

In an embodiment, as the switch 130 is changed to the on state or the off state with a predetermined frequency, it may generate an alternating current component which is close to the form of a square wave, in the signal current applied from the fuel cell stack 110.

Figure 2A:
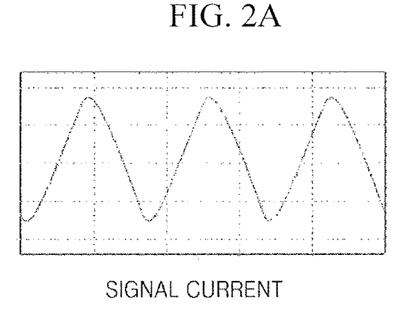
FIG. 2A and FIG. 2B are graphs showing the signal current injected into the fuel cell stack and a frequency analysis result of the signal current in accordance with the embodiment.
Figure 2B:
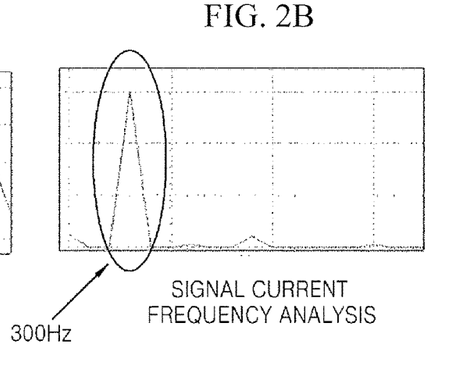

For example, as the switch 130 is changed to the on state or the off state with the frequency of 300 Hz according to the pulse width modulation scheme of the signal received from the control unit 160, it may generate an alternating current component close to the form of a square wave of 300 Hz, in the signal current. The signal current will be described later in detail with reference to FIG. 2.

The switch 130 is changed to the on state or the off state by the unit of a predetermined time. In an embodiment, the switch 130 may be changed to the on state or the off state quickly or slowly according to a frequency (for example, 300 Hz or 10 Hz) to be used.

The converter 140 converts the boost voltage generated in the inductor 120, into a predetermined voltage, and provides the predetermined voltage to a load (for example, charges a battery for a vehicle). For example, the converter 140 may buck the boost voltage of 500V generated in the inductor 120, to 12V. Such a converter 140 may be a buck type DC-DC converter or an isolation DC-DC converter for isolation from a high voltage such as a boost voltage.

Unlike the illustration of FIG. 1, the converter 140 may not convert the boost voltage into a predetermined voltage and provide the boost voltage as it is, to a load (for example, a high voltage battery, or the like).

The current sensor 150 measures the value of the signal current and provides the value to the control unit 160.

The control unit 160 calculates the impedance of the fuel cell stack 110 by using the current of the fuel cell stack 110 and the voltage of the fuel cell stack 110. This process will be described below in detail.

When the control unit 160 is transferred with the signal current from the current sensor 150, it may calculate the current of the fuel cell stack 110 by using the signal current. The signal current means the current applied from the fuel cell stack 110. The alternating current component is included in the signal current applied from the fuel cell stack 110, and exerts an influence on the current of the fuel cell stack 110, as it is. Accordingly, the control unit 160 may calculate the current of the fuel cell stack 110 by analyzing the signal current applied from the fuel cell stack 110.

In an embodiment, when the control unit 160 is transferred with the signal current from the current sensor 150, it may calculate the current of the fuel cell stack 110 corresponding to a predetermined frequency by frequency-analyzing the signal current. For example, when the control unit 160 is transferred with the signal current from the current sensor 150, it may calculate the current of the fuel cell stack 110 corresponding to 300 Hz by frequency-analyzing the signal current.

Further, the control unit 160 may measure the voltage of the fuel cell stack 110, and calculate the voltage of the fuel cell stack 110 corresponding to a predetermined frequency by frequency-analyzing the voltage of the fuel cell stack 110.

Moreover, the control unit 160 may calculate the impedance of the fuel cell stack 110 by using the current of the fuel cell stack 110 and the voltage of the fuel cell stack 110.

In an embodiment, the control unit 160 may calculate the impedance of the fuel cell stack 110 based on the following Equation 1.

$$A = V/I \qquad \text{[Equation 1]}$$

A: The impedance of the fuel cell stack 110
V: The voltage of the fuel cell stack 110
I: The current of the fuel cell stack 110

For example, the control unit 160 may calculate the impedance of the fuel cell stack 110 by using the voltage of the fuel cell stack 110 corresponding to 300 Hz and the current of the fuel cell stack 110 corresponding to 300 Hz.

The control unit 160 may determine whether a fault has occurred in the fuel cell stack 110, by using the result of a frequency analysis corresponding to a predetermined frequency.

In an embodiment, the control unit 160 may calculate a total harmonic distortion (THD) by using the result of a frequency analysis corresponding to a predetermined frequency, and determine whether a fault has occurred in the fuel cell stack 110, by using the total harmonic distortion. For example, the control unit 160 may calculate a total harmonic distortion by using the voltage of the fuel cell stack 110 corresponding to 10 Hz, and determine whether a fault has occurred in the fuel cell stack 110, by using the total harmonic distortion.

FIG. 2 is of graphs showing the signal current injected into the fuel cell stack and a frequency analysis result of the signal current in accordance with the embodiment.

(a) of FIG. 2 is a graph showing the signal current injected into the fuel cell stack, and (b) of FIG. 2 is a graph showing a frequency analysis result of the signal current injected into the fuel cell stack.

The apparatus 100 for generating injection current for a fuel cell stack injects the signal current into the fuel cell stack 110. The alternating current component generated according to a change in the state of the switch 130 is included in the signal current which is injected into the fuel cell stack 110.

The switch 130 generates the alternating current component in the signal current while being changed to the on state and the off state with a predetermined frequency, and the alternating current component generated by the switch 130 has the form of a square wave. Accordingly, the signal current injected into the fuel cell stack 110 is represented in the form of a square wave as in (a) of FIG. 2.

The apparatus 100 for generating injection current for a fuel cell stack may obtain the graph as shown in (b) of FIG. 2 by frequency-analyzing the signal current as shown in (a) of FIG. 2, and calculate the current of the fuel cell stack 110 corresponding to 300 Hz in (b) of FIG. 2. The reason why the signal current is used in the process of calculating the current of the fuel cell stack 110 in this way is because the alternating current component included in the signal current exerts an influence on the current of the fuel cell stack 110, as it is.

Figures 3A, 3B:
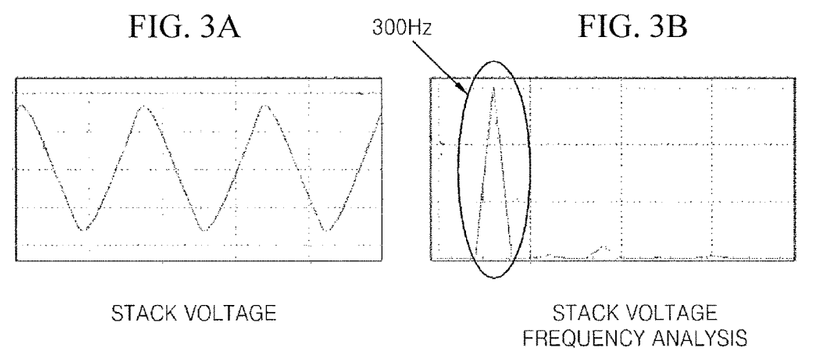
FIG. 3A and FIG. 3B are graphs showing the voltage of the fuel cell stack and a frequency analysis result of the voltage of the fuel cell stack in accordance with the embodiment.

FIG. 3 is of graphs showing the voltage of the fuel cell stack and a frequency analysis result of the voltage of the fuel cell stack in accordance with the embodiment.

(a) of FIG. 3 is a graph showing the voltage of the fuel cell stack, and (b) of FIG. 3 is a graph showing a frequency analysis result of the voltage of the fuel cell stack.

The apparatus 100 for generating injection current for a fuel cell stack may obtain the graph as shown in (a) of FIG. 3 by measuring the voltage of the fuel cell stack 110, obtain the graph as shown in (b) of FIG. 3 by frequency-analyzing the voltage of the fuel cell stack 110, and calculate the voltage of the fuel cell stack 110 corresponding to 300 Hz in (b) of FIG. 3.

Figure 4:
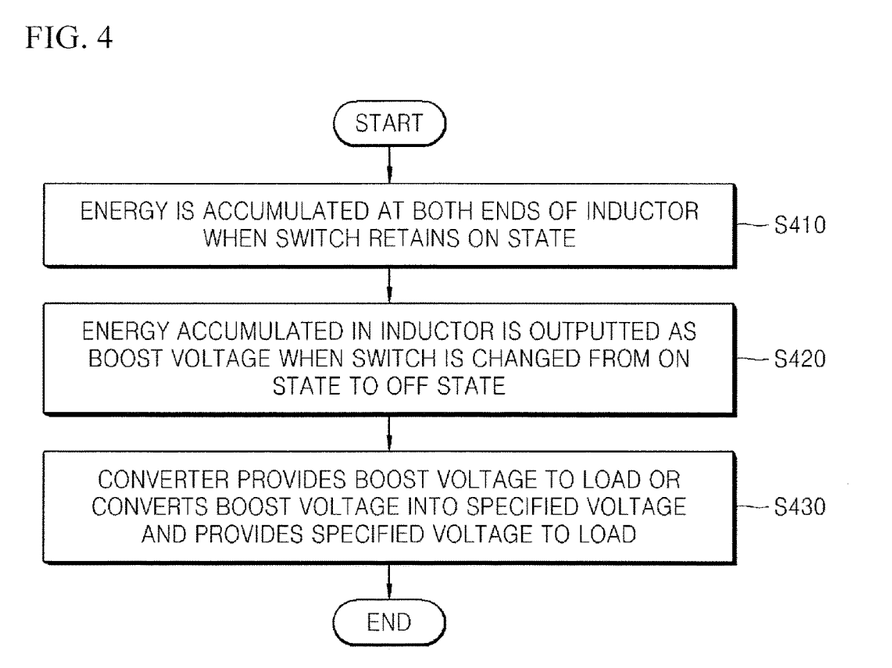
FIG. 4 is a flow chart explaining a method for generating injection current for a fuel cell stack in accordance with an embodiment.

FIG. 4 is a flow chart explaining a method for generating injection current for a fuel cell stack in accordance with an embodiment.

Referring to FIG. 4, the apparatus 100 for generating injection current for a fuel cell stack accumulates energy in an inductor when the state of a switch retains an on state (S410). The apparatus 100 for generating injection current for a fuel cell stack outputs the energy accumulated in the inductor, as a boost voltage, when the state of the switch is changed from the on state to an off state (S420). The apparatus 100 for generating injection current for a fuel cell stack provides the boost voltage to a load or converts the boost voltage into a predetermined voltage and provides the predetermined voltage to a load (S430).

Figure 5:
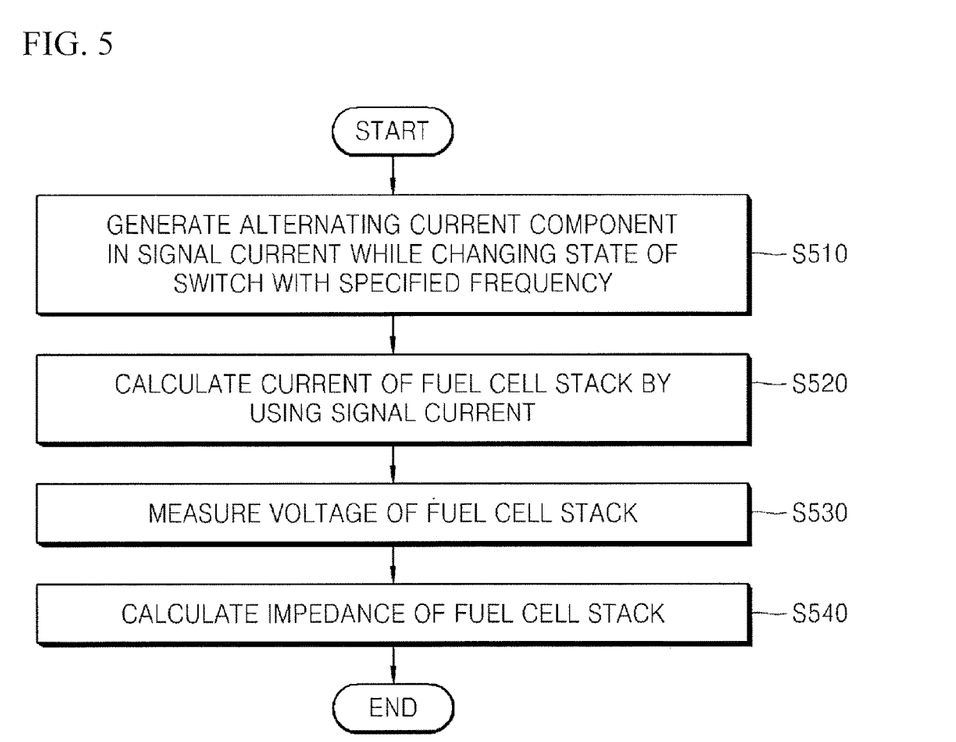
FIG. 5 is a flow chart explaining a method for generating injection current for a fuel cell stack in accordance with an embodiment.

FIG. 5 is a flow chart explaining a method for generating injection current for a fuel cell stack in accordance with an embodiment.

Referring to FIG. 5, the apparatus 100 for generating injection current for a fuel cell stack generates an alternating current component in the signal current applied from a fuel cell stack while changing the state of a switch (S510). The apparatus 100 for generating injection current for a fuel cell stack calculates the current of the fuel cell stack by using the signal current (S520). The apparatus 100 for generating injection current for a fuel cell stack measures the voltage of the fuel cell stack (S530). The apparatus 100 for generating injection current for a fuel cell stack calculates the impedance of the fuel cell stack by using the current of the fuel cell stack and the voltage of the fuel cell stack (S540).

As is apparent from the above descriptions, according to the embodiments, an alternating current component generated due to a change in the state of a switch is generated in the stack current flowing from a fuel cell stack to a load, whereby it is possible to simplify the configuration of an apparatus for generating alternating current to diagnose a fault of a fuel cell stack, decrease the volume of parts and reduce the cost of a product.

Also, according to the embodiments, a boost voltage generated by an inductor according to a change in the state of a switch is provided to a load as it is or is provided to a load after being converted into a predetermined voltage, whereby it is possible to improve the efficiency of a system.

Further, according to the embodiments, a resistor is not used, whereby it is possible to decrease heat loss by the current flowing through the resistor, ease a heat dissipation scheme, decrease the volume of parts and reduce the cost of the parts.

Hereinabove, although specific exemplary embodiments of the present invention have been described, various modifications may be made without departing from the scope of the present invention. Accordingly, the scope of the present invention is not construed as being limited to the described exemplary embodiments, but should be defined by the following claims as well as equivalents thereof.

Although the present invention has been described with reference to the exemplary embodiments and the accompanying drawings, it is not limited to the above-mentioned exemplary embodiments, but may be variously modified and altered from the above description by those skilled in the art to which the present invention pertains. Therefore, the scope and spirit of the present invention should be understood only by the following claims, and all of the equivalences and equivalent modifications of the claims should be intended to fall within the scope and spirit of the present invention.

What is claimed is:

1. An apparatus for generating injection current for a fuel cell stack, comprising:
   a switch configured to retain any one state of an on state and an off state;
   an inductor configured to output accumulated energy according to a state of the switch as a boost voltage and a signal current, wherein the signal current is applied to the fuel cell stack so as to diagnose a fault of the fuel cell stack; and
   a converter configured to provide the boost voltage received from the inductor to a load or convert the boost voltage into a predetermined voltage and provide the predetermined voltage to a load; and
   a control unit configured to receive the signal current and calculate total harmonic distortion (THD) and impedance of the fuel cell stack,
   wherein the switch generates an alternating current component in the signal current which is applied to the fuel cell stack, while the state of the switch is controlled to be changed by the unit of a predetermined time according to a frequency to be used, and
   wherein the control unit calculates the THD through a frequency analysis corresponding to the frequency to be used, and determines the fault of the fuel cell stack when the THD is equal to or more than a predetermined harmonic distortion.

2. The apparatus according to claim 1, wherein the inductor accumulates energy at both ends thereof when the state of the switch retains the on state, and outputs the accumulated energy as the boost voltage when e state of the switch is changed from the on state to the off state.

3. The apparatus according to claim 1,
   wherein the control unit is configured to calculate current of the fuel cell stack by using the signal current, and calculate the impedance of the fuel cell stack by using the current of the fuel cell stack and a voltage of the fuel cell stack.

4. The apparatus according to claim 3, wherein the control unit calculates a current of the fuel cell stack corresponding to a predetermined frequency by frequency-analyzing the signal current.

5. The apparatus according to claim 3, wherein the control unit calculates a voltage of the fuel cell stack corresponding to a predetermined frequency by frequency-analyzing the voltage of the fuel cell stack.

6. The apparatus according to claim 5, wherein the control unit calculates a voltage of the fuel cell stack corresponding to any one frequency of 300 Hz and 10 Hz.

7. The apparatus according to claim 1, wherein the state of the switch is controlled by a pulse width modulation (PWM) signal of the control unit to be changed with the unit of the predetermined time according to the frequency to be used.

8. A method for generating injection current for a fuel cell stack, performed in an apparatus for generating injection current for the fuel cell stack, the method comprising:
  accumulating energy in an inductor when a state of a switch retains an on state;
  outputting, by the inductor, accumulated energy as a signal current which is applied to the fuel cell stack to diagnose a fault of the fuel cell stack and a boost voltage when the state of the switch is changed from the on state to an off state;
  providing the boost voltage to a load or converting the boost voltage into a predetermined voltage and providing the predetermined voltage to a load, by a converter to which the boost voltage is supplied; and
  calculating, by a control unit, total harmonic distortion (THD) and impedance of the fuel cell stack,
  wherein the switch generates an alternating current component in the signal current which is applied to the fuel cell stack, while a state of the switch is controlled by the control unit to be changed by the unit of a predetermined time according to a frequency to be used,
  wherein the calculating of the total harmonic distortion (THD) and the impedance of the fuel cell stack comprises:
    calculating, by the control unit, THD through a frequency analysis corresponding to the frequency to be used; and
    determining, by the control unit, the fault of the fuel cell stack when the THD is equal to or more than a predetermined harmonic distortion.

9. The method according to claim 8, wherein the total harmonic distortion (THD) and impedance of the fuel cell stack comprises:
  calculating, by the control unit, current of the fuel cell stack by using the signal current; and
  calculating, by the control unit, the impedance of the fuel cell stack by using the current of the fuel cell stack and a voltage of the fuel cell stack.

10. The method according to claim 9, wherein the calculating of the current of the fuel cell stack comprises:
  calculating, by the control unit, the current of the fuel cell stack corresponding to a predetermined frequency by frequency-analyzing the signal current.

11. The method according to claim 9, wherein the calculating of the impedance of the fuel cell stack comprises:
  calculating, by the control unit, a voltage of the fuel cell stack corresponding to a predetermined frequency by frequency-analyzing the voltage of the fuel cell stack.

12. The method according to claim 11, wherein the calculating of the voltage of the fuel cell stack corresponding to the predetermined frequency calculates a voltage of the fuel cell stack corresponding to any one frequency of 300 Hz and 10 Hz.

13. The method according to claim 8, wherein the state of the switch is controlled by a PWM signal of the control unit to be changed with the unit of the predetermined time according to the frequency to be used.

* * * * *